(12) United States Patent
Wang et al.

(10) Patent No.: US 11,958,364 B2
(45) Date of Patent: Apr. 16, 2024

(54) SYSTEMS AND METHODS FOR SHAFT TORQUE SECURITY ELECTRICAL VEHICLES

(71) Applicant: Rivian IP Holdings, LLC, Plymouth, MI (US)

(72) Inventors: Kang Wang, Palos Verdes Estates, CA (US); Younes Sangsefidi, Irvine, CA (US); Chia-Chou Yeh, Torrance, CA (US); Brian Harries, Redondo Beach, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 553 days.

(21) Appl. No.: 17/193,084

(22) Filed: Mar. 5, 2021

(65) Prior Publication Data
US 2022/0281324 A1   Sep. 8, 2022

(51) Int. Cl.
*B60L 15/20*   (2006.01)
*B60K 1/00*   (2006.01)
(Continued)

(52) U.S. Cl.
CPC ............... *B60L 15/20* (2013.01); *B60K 1/00* (2013.01); *G07C 5/0808* (2013.01);
(Continued)

(58) Field of Classification Search
CPC ............... B60L 15/20; B60L 2240/423; B60L 2260/14; B60L 2260/167; B60L 2240/421;
(Continued)

(56) References Cited

U.S. PATENT DOCUMENTS

| 6,490,511 B1 * | 12/2002 | Raftari | B60W 20/11 |
| | | | 903/910 |
| 2013/0093372 A1 * | 4/2013 | Thyagarajan | H02P 21/18 |
| | | | 318/400.04 |

(Continued)

FOREIGN PATENT DOCUMENTS

| CN | 1605704 | * | 4/2005 |
| DE | 102019115654 | * | 4/2020 |

(Continued)

OTHER PUBLICATIONS

Zhang et al., "Investigation of Torque Security Problems in Electrified Vehicles", Proceedings of the ASME 2015 Dynamic Systems and Control Conferences, DSCC 2015-9627, Oct. 28-30, 2015, pp. 1-10.

*Primary Examiner* — Muhammad Shafi
(74) *Attorney, Agent, or Firm* — Haley Guiliano LLP

(57) ABSTRACT

A torque security system for a vehicle is provided. The system receives a signal from a sensor coupled to a motor shaft of an electric motor and determines an acceleration of the electric motor, based on the signal from the sensor that indicates an amount of rotation of the motor shaft. The system determines an internal torque between the motor shaft and an input gear coupled to the motor shaft, based on the acceleration of the electric motor and an inertia of the electric motor and a gearbox. The powertrain of the vehicle comprises the gearbox and the electric motor, and the input gear couples the electric motor to the gearbox. The system determines whether the internal torque exceeds a threshold torque, and in response to determining that the internal torque exceeds the threshold torque, the system reduces power output to the electric motor. The system also diagnoses the health of the gearbox.

20 Claims, 7 Drawing Sheets

(51) Int. Cl.
*G07C 5/08* (2006.01)
*H02K 7/00* (2006.01)
*H02K 7/116* (2006.01)
*H02K 11/33* (2016.01)
*H02K 24/00* (2006.01)
*H02P 29/032* (2016.01)
*B60W 30/184* (2012.01)
*B60W 50/00* (2006.01)

(52) U.S. Cl.
CPC .......... *G07C 5/0816* (2013.01); *H02K 7/006* (2013.01); *H02K 7/116* (2013.01); *H02K 11/33* (2016.01); *H02K 24/00* (2013.01); *H02P 29/032* (2016.02); *B60L 2240/423* (2013.01); *B60L 2260/14* (2013.01); *B60L 2260/167* (2013.01); *B60W 30/184* (2013.01); *B60W 2050/0052* (2013.01); *B60W 50/0098* (2013.01); *B60W 2510/081* (2013.01); *B60W 2510/083* (2013.01); *B60W 2710/086* (2013.01)

(58) Field of Classification Search
CPC ......... B60L 2240/429; B60L 2240/486; B60L 3/0061; B60L 50/60; B60L 3/12; B60L 2240/42; B60K 1/00; B60K 1/02; G07C 5/0808; G07C 5/0816; H02K 7/006; H02K 7/116; H02K 11/33; H02K 24/00; H02K 11/21; H02P 29/032; H02P 2205/05; H02P 29/024; B60W 30/184; B60W 50/0098; B60W 2050/0052; B60W 2510/081; B60W 2510/083; B60W 2710/086
USPC ......................................................... 701/22
See application file for complete search history.

(56) References Cited

U.S. PATENT DOCUMENTS

| | | | |
|---|---|---|---|
| 2017/0050452 A1* | 2/2017 | Hamano | ............ B65H 23/1955 |
| 2017/0240165 A1* | 8/2017 | Kumazaki | ............. F02M 33/00 |
| 2020/0087127 A1* | 3/2020 | Hammer | ................... B60L 3/08 |

FOREIGN PATENT DOCUMENTS

| | | | |
|---|---|---|---|
| EP | 1584847 | * | 10/2005 |
| WO | WO-2018227885 | * | 12/2018 |

* cited by examiner

SYSTEMS AND METHODS FOR SHAFT TORQUE SECURITY ELECTRICAL VEHICLES

SUMMARY

It is advantageous to provide a torque security system in a vehicle driven by an electric motor (e.g., a hybrid or electric vehicle) by monitoring the torque output by the electric motor to prevent over-torque situations in which the motor shaft of the electric motor or other components of the powertrain (e.g., the electric motor and drivetrain) may be damaged. For example, if the torque security system detects an over-torque condition (e.g., exceeding the torque rating of the motor shaft), it is advantageous to reduce power to the electric motor (e.g., by torque-limiting the electric motor) before the motor shaft of the electric motor or other components of the powertrain are damaged.

In one approach, a system estimates a motor shaft torque (e.g., the torque output by an electric motor) based on the output of a sensor (e.g., rotation sensor) installed on a wheel of a vehicle. In this approach, however, the system may not be able to accurately estimate the motor shaft torque or detect certain oscillations due to gear latch and gearbox damping introduced by a gearbox coupled to the electric motor. As a result, the powertrain may be damaged (e.g., breakage of the motor shaft). Further, in this approach, the system may not be able to detect an over-torque condition quickly enough to prevent damage to the powertrain. Still further, in this approach, the system may not be to diagnose damage to the gearbox during operation (e.g., a broken tooth on an input gear coupled to the motor shaft).

Accordingly, in some embodiments it would be advantageous to provide a system that quickly detects certain oscillations and over-torque conditions and reduces power to the electric motor to prevent powertrain damage. Additionally, in some embodiments it would be advantageous to provide a system that is able to diagnose damage to the gearbox (e.g., a damaged input gear).

To solve one or more of these problems, a torque security system and a vehicle including the torque security system are provided. The torque security system monitors a signal from a sensor coupled to a motor shaft of an electric motor and determines an acceleration of the electric motor based on the monitored signal. The sensor indicates an amount of rotation of the motor. The system determines an internal torque between the motor shaft and an input gear coupled to the motor shaft, based on the acceleration of the electric motor and the inertia of the electric motor and a gearbox. A powertrain of the vehicle includes the gearbox and the electric motor, and the input gear couples the electric motor to the gearbox. The system determines whether the internal torque exceeds a threshold torque. In response to determining that the internal torque exceeds the threshold torque, the system reduces power output to the electric motor. By quickly reducing the power output to the electric motor, damage to the powertrain may be prevented.

In some embodiments, the system may reduce the power output to the electric motor by performing an emergency shutoff by reducing the power output to zero.

In some embodiments, the system may reduce the power output to the electric motor by reducing an output of an inverter driving the electric motor.

In some embodiments, the system may determine the internal torque by determining a product of the acceleration of the electric motor and the inertia of the electric motor and the gearbox.

In some embodiments, the threshold torque may include a first threshold torque and a second threshold torque. The system may determine whether the internal torque exceeds the threshold torque by determining whether the internal torque exceeds the first threshold torque (e.g., a shutdown torque threshold). In response to determining that the internal torque exceeds the first threshold torque, the system may determine that the internal torque exceeds the threshold torque. In response to determining that the internal torque does not exceed the first threshold torque, the system may determine whether the internal torque exceeds the second threshold torque (e.g., a conditional shutdown torque threshold) for at least a threshold number of consecutive cycles. In response to determining that the internal torque exceeds the second threshold torque for at least the threshold number of consecutive cycles, the system may determine that the internal torque exceeds the threshold torque. In response to determining that the internal torque does not exceed the second threshold torque for at least the threshold number of consecutive cycles, the system may determine that the internal torque does not exceed the threshold torque.

In some embodiments, the first threshold torque may be greater than the second threshold torque.

In some embodiments, the system may determine a speed of the electric motor, based on the signal from the resolver, and may determine whether the speed of the electric motor is constant. In response to determining that the speed of the electric motor is constant, the system may convert the acceleration of the electric motor into the frequency domain, may filter the converted acceleration with a bandpass filter, and may determine whether the input gear is damaged, based on an output of the bandpass filter.

In some embodiments, the system may set parameters of the bandpass filter based on the speed of the electric motor and a number of teeth on the input gear.

In some embodiments, the system may determine whether the input gear is damaged by determining whether a harmonic of the output of the bandpass filter, corresponding to the number of teeth on the input gear, exceeds a threshold. In some embodiments, in response to determining that the harmonic of the output of the bandpass filter exceeds the threshold, the system may determine that the input gear is damaged. In some embodiments, in response to determining that the input gear is damaged, the system may generate for output a notification that the input gear is damaged.

In some embodiments, the threshold torque may correspond to a torque limit of the motor shaft (e.g., the maximum torque that can be applied to the motor shaft before the motor shaft is damaged).

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
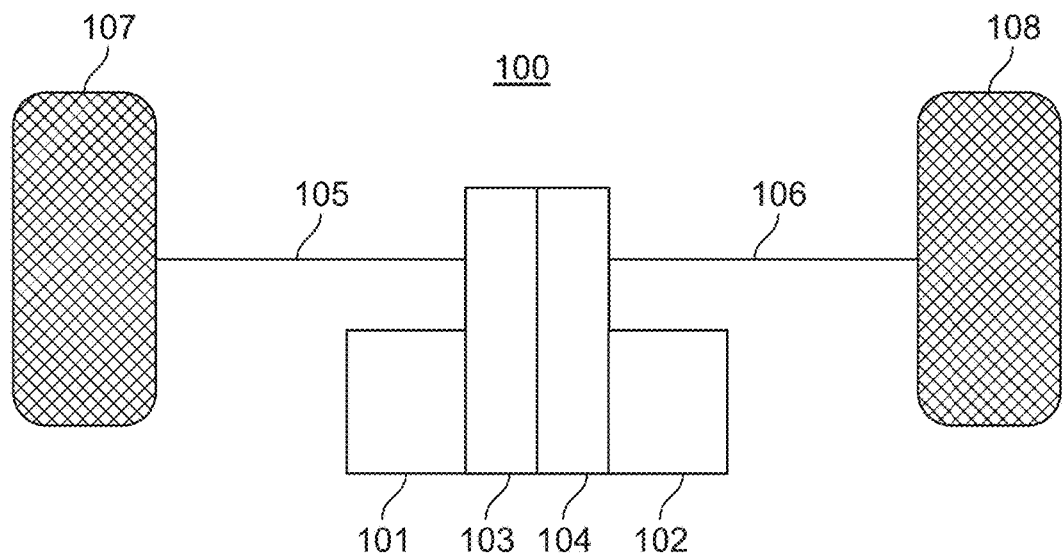
FIG. 1 depicts a diagram of an illustrative powertrain, in accordance with some embodiments of the present disclosure.

FIG. 1 depicts a diagram of an illustrative powertrain 100, in accordance with some embodiments of the present disclosure. As shown, the powertrain 100 includes electric motors 101 and 102, gearboxes 103 and 104, axels 105 and 106, and wheels 107 and 108. As shown, each of the electric motors 101 and 102 drives a respective one of the wheels 107 and 108. For example, electric motor 102 may be coupled to gearbox 104 and drives the wheel 108 through the axel 106. However, this is only an example, and a single electric motor may drive multiple wheels. In some embodiments, the wheels 107 and 108 may be front or rear wheels.

Figure 2:
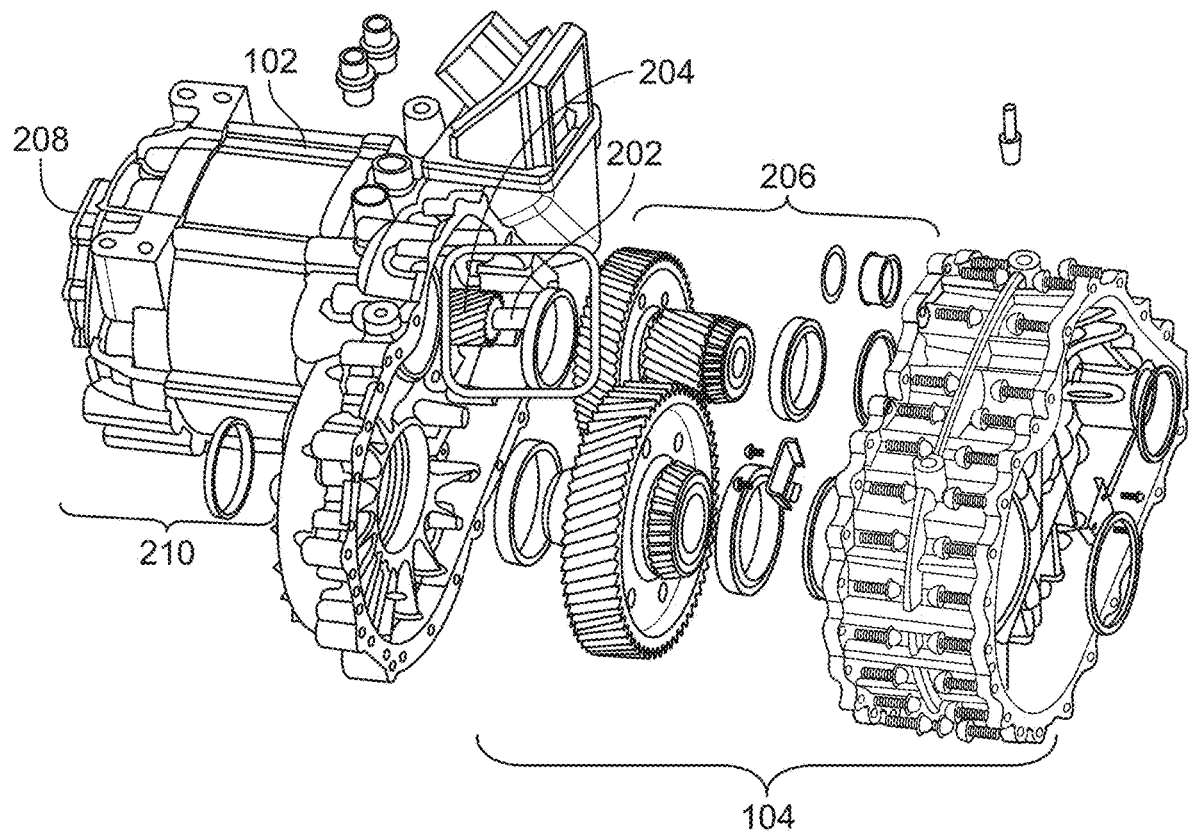
FIG. 2 is an exploded view of one of the electric motors and gearboxes of the powertrain of FIG. 1, in accordance with some embodiments of the present disclosure.

FIG. 2 is an exploded view 200 of one of the electric motors and gearboxes of the powertrain 100 of FIG. 1, in accordance with some embodiments of the present disclosure. As shown, the electric motor 102 includes a motor shaft 202 and an input gear 204 coupled to the motor shaft 202. As shown, the electric motor 102 may be surrounded by a casing 210. The input gear 204 transfers rotational energy from the electric motor 202 to gears 206 of the gearbox 104. In some embodiments, the number of gears 206 is illustrative, and the gearbox 104 may include any number of the gears 206. In some embodiments, a sensor (e.g., a resolver 208) may be coupled to the motor shaft 202 of the electric motor. In some embodiments, the resolver 208 may be a type of transformer/electromagnetic transducer that measures the degrees of rotation of the motor shaft 202. For example, the resolver 208 may be a type of rotary transformer including a cylindrical rotor and stator. Although a resolver is shown, any suitable sensor configured to measure the degrees of rotation of the motor shaft 202 may be used.

Figure 3:
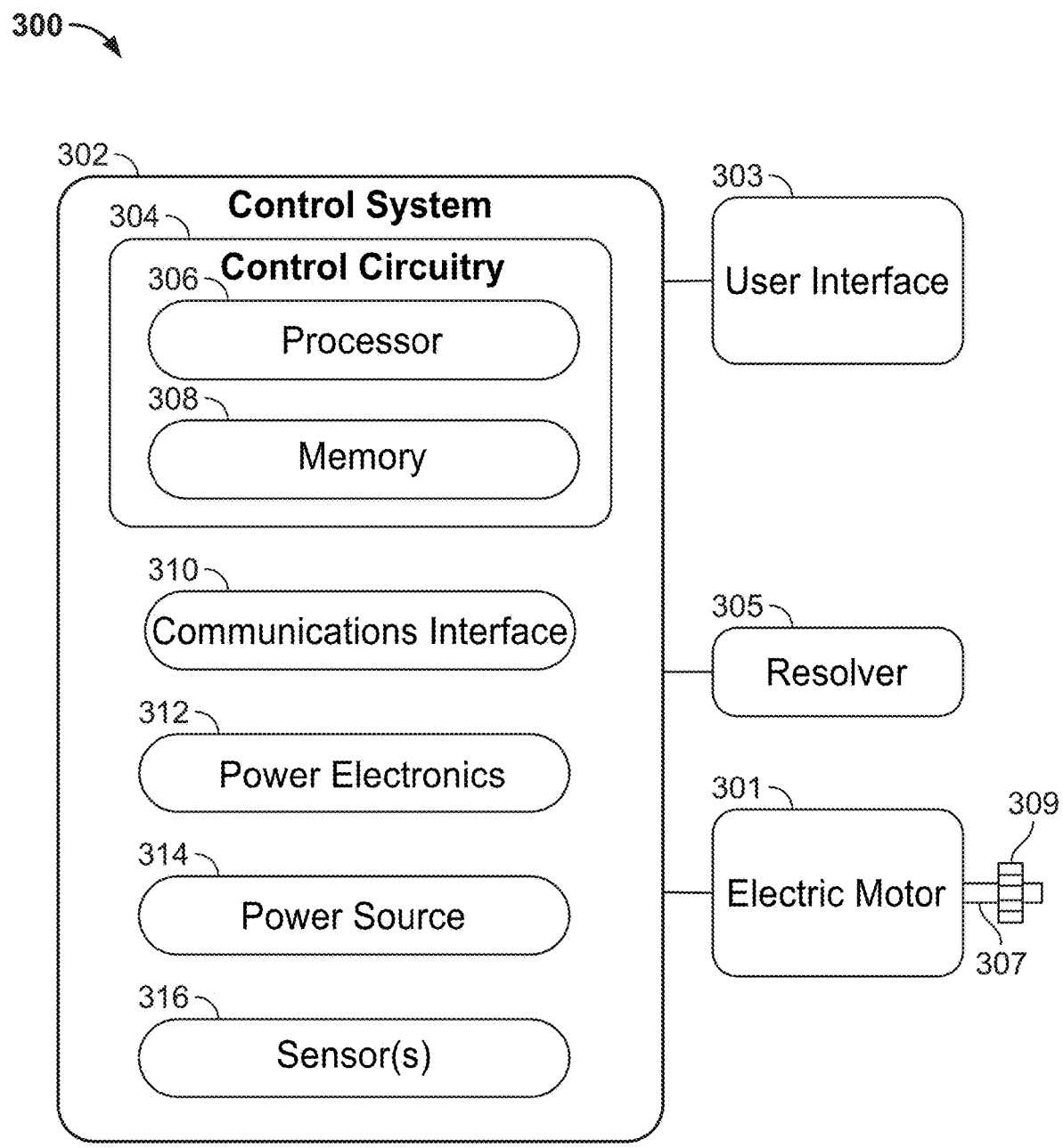
FIG. 3 depicts a system diagram of an illustrative system, in accordance with some embodiments of the present disclosure.

FIG. 3 depicts a system diagram of an illustrative system 300, in accordance with some embodiments of the present disclosure. As shown, the system 300 includes an electric motor 301, a control system 302, a user interface 303, and a resolver 305. As shown, the control system 302 includes control circuitry 304, a communications interface 310, power electronics 312, power source 314, and one or more sensors 316. As shown, the electric motor 301 may include a motor shaft 307 and an input gear 309 coupled to the motor shaft 307 (e.g., as described above with reference to FIG. 2). The control circuitry 304 includes a processor 306 and memory 308. In an illustrative example, the control system 302 may be used to monitor over-torque conditions and take corrective action before a powertrain (e.g., the powertrain 100 in FIG. 1) is damaged. In some embodiments, the control system 302 may also be used to diagnose damage to a gearbox (e.g., the gearbox 103, 104 in FIG. 1).

The control circuitry 304 may include hardware, software, or both, implemented on one or more modules configured for controlling operation of the electric motor 301 and for implementing a torque security application. In some embodiments, the processor 306 may include one or more processors such as, for example, a central processing unit having a single core or dual core, bus, logic circuitry, integrated circuitry, digital signal processor, graphics processor, an embedded processing device, any other suitable components for reading and executing computer instructions, or any combination thereof. The memory 308 may include any suitable storage device such as, for example, volatile memory, non-volatile memory, a removable storage device, a solid-state storage device, an optical device, a magnetic device, any other suitable component for storing and recalling information, or any combination thereof. The communications interface 310 may include electrical terminals, level shifters, a communications module, connectors, cables, antennas, any other suitable components for transmitting and receiving information, or any combination thereof. For example, the communications interface 310 may include an ethernet interface, a WiFi interface, an optical interface, a sensor interface (e.g., for interacting with one or more sensors 316), any other suitable wired or wireless interface, or any combination thereof. To illustrate, the communication interface 310 may include a sensor interface having a power supply, analog-to-digital converter, digital-to-analog converter, signal processing equipment, signal conditioning equipment, connectors, electrical terminals, any other suitable components for managing signals to and from a sensor, or any combination thereof. To illustrate further, a sensor interface may be configured to communicate with the resolver 305, a current sensor, a position sensor (e.g., a rotary encoder coupled to the motor shaft or gear shaft), a temperature sensor, a voltage sensor, an accelerometer (e.g., a vibration sensor), any other suitable sensor of sensor(s) 316 or any combination thereof. In some embodiments, communications interface 310 is configured to transmit a control signal indicative of a motor command to power electronics 312. The power electronics 312 may include an inverter, a motor drive, switches (e.g., IGBTs, MOSFETs, diodes (e.g., a fly-back diode), one or more buses (e.g., a DC bus), any other suitable components, arranged in any suitable configuration (e.g., an H-bridge, a half-bridge), or any combination thereof. The power source 314 may include a battery, a battery system, leads coupled to a battery system, or a combination thereof for providing electric power to the components of the control system 302, any other suitable components, or any combination thereof.

The user interface 303 may include display (e.g., a touchscreen or touch sensitive display) provided as a standalone device or integrated with other elements of the control system 302. A video card or graphics card may be integrated with the control circuitry 304 and may generate the output to the user interface 303. In some embodiments, the user interface may display notifications (e.g., torque security notifications) to a user (e.g., driver of the vehicle).

In an illustrative example, control system 302 may be configured to control the electric motor 301. In some embodiments, the electric motor 301 includes phases, corresponding to windings, that are coupled via phase leads to the power electronics 312. In some such embodiments, the power electronics 312 are configured to receive control signals from the control circuitry 304. The control circuitry 304 may be configured to implement a motor control application, based on computer instructions stored in the memory 308, that generates the control signal based on one or more inputs. For example, the control circuitry 304 may be configured to implement a control scheme for generating a current command based on a desired performance (e.g., a desired motor position, speed, acceleration, torque, flux, or a combination thereof), and may generate a control signal indicative of the current command. To illustrate, the control signal may include a pulse-width modulated (PWM) signal, a pulse-density modulated (PDM) signal, an analog signal, a digital signal (e.g., via serial or parallel interface), any other suitable signal type, or any combination thereof.

In an illustrative example, the control system 302 (e.g., or the control circuitry 304) may be configured to execute a torque security application to detect over-torque conditions and reduce power to the electric motor 301 (via the power electronics 312) to prevent damage to the powertrain of the vehicle. The control system 302 (e.g., or the control circuitry 304) may also be configured to execute a torque security application to diagnose conditions and/or damage to the input gear 309 of the electric motor 301. The control system 302 (e.g., or the control circuitry 304) may also be configured to execute the torque security application for displaying notifications (e.g., via the user interface 303) to a user (e.g., the driver of the vehicle).

Figure 4:
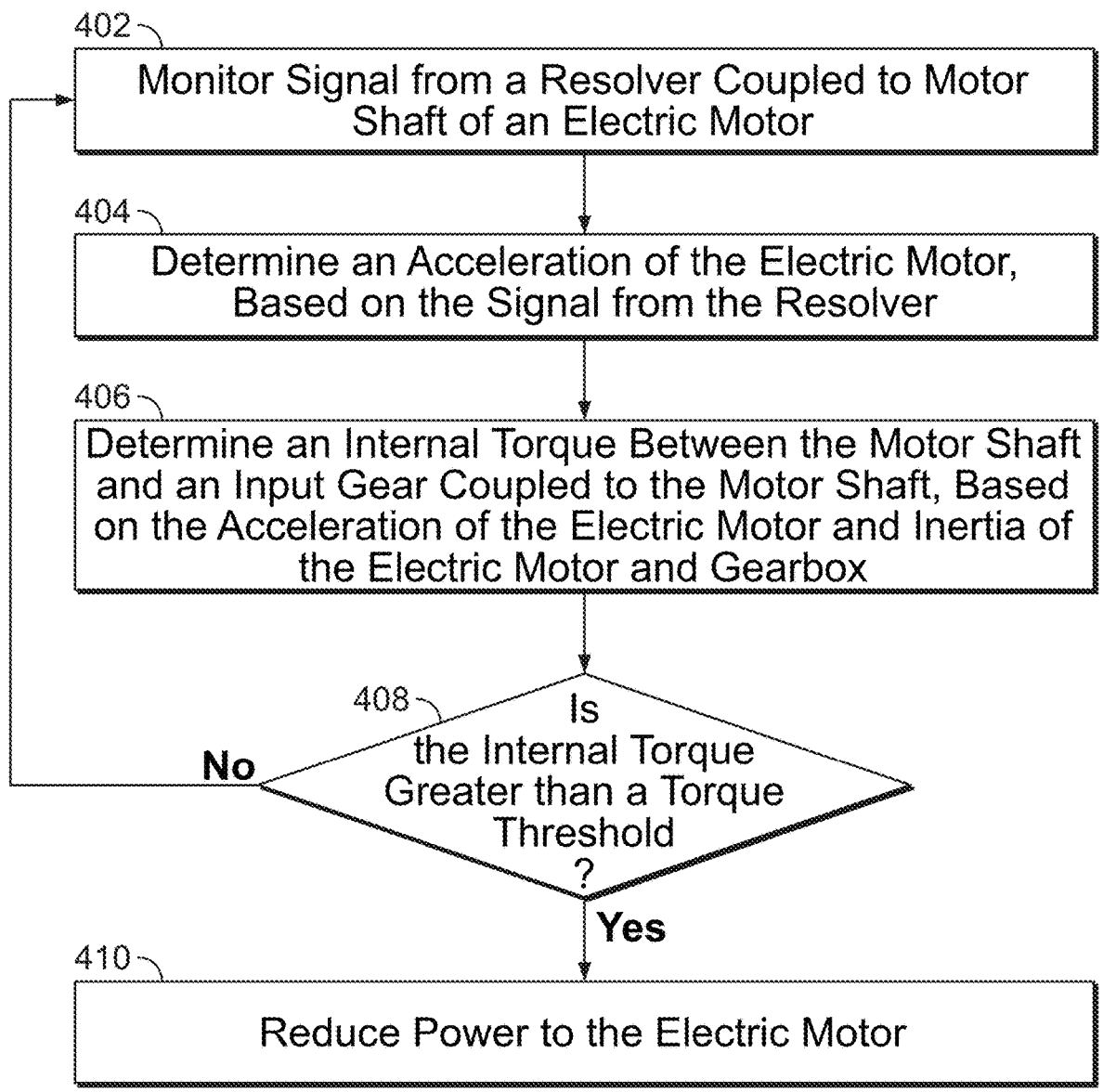
FIG. 4 depicts a flowchart of an illustrative process implementing a torque security application, in accordance with some embodiments of the present disclosure.

FIG. 4 depicts a flowchart of an illustrative process 400 implementing a torque security application, in accordance with some embodiments of the present disclosure. The process 400 may be implemented by, for example, the control system 302 of FIG. 3 (e.g., or any aspects thereof), any other suitable system for executing computer instructions and generating a control signal (e.g., a fault control signal), or any combination thereof. In some embodiments, it may be advantageous to implement the process 400 to diagnose an over-torque condition in approximately 1 ms or less.

The process 400 begins at step 402, when the torque security application (e.g., via the control circuitry 304) monitors (e.g., via the communications interface 310) a signal output by a resolver (e.g., the resolver 305) that measures the degrees of rotation of a motor shaft (e.g., the motor shaft 307) of an electric motor (e.g., the electric motor 301). For example, the control circuitry 304 receives position information in the signal received from the resolver.

At step 404, the torque security application (e.g., via the control circuitry 304), determines an acceleration of the electric motor (e.g., the acceleration of the motor shaft of the electric motor) based on the signal received from the resolver. For example, in some embodiments, the control circuitry 304 may implement a resolver-to-digital converter, which converts the signal from the resolver into the angular position and velocity of the motor shaft of the electric motor. In some embodiments, the control circuitry 304 may determine the acceleration from the determined velocity (e.g., by taking the derivative of the determined velocity). However, this is only one example, and the acceleration of the electric motor may be calculated using any suitable method. For example, the control circuitry 304 may determine the acceleration using Equation [1], where o-p is the zero-to-peak value of the signal output by the resolver and frequency is the frequency of the signal. For example, using Equation [1], if the frequency is 200 Hz and o-p is 50 radians/second, the control circuitry 304 may determine the acceleration to be approximately 62,800 radian/s².

$$a = 2\pi * \text{freq} * (o-p) \qquad (1)$$

At step 406, the torque security application (e.g., via the control circuitry 304), determines an internal torque between the motor shaft of the electric motor and an input gear (e.g., the input gear 309) coupled to the motor shaft, based on the determined acceleration of the electric motor and the inertia of the electric motor and gearbox (e.g., the gearbox 104 of FIG. 2).

For example, the internal torque may be calculated as a product of the determined acceleration and the inertia of the electric motor and gearbox, as shown below in Equation [2].

$$\text{internal\_torque} = a * \text{inerta}_{(motor\ and\ gearbox)} \qquad (2)$$

In some embodiments, the inertia of the electric motor and gearbox may be determined in advance and stored in a memory (e.g., the memory 308). The inertia of the electric motor and gearbox may be determined using any suitable method (e.g., by calculating a collection of point masses in the electric motor and gearbox). For example, in the illustrative embodiment, the inertia of the electric motor and gearbox may be 0.02 kg*m².

At step 408, the torque security application (e.g., via the control circuitry 304), determines if the internal torque is greater than a torque threshold. The torque threshold may be determined in advance based on the maximum torque specifications of the powertrain (e.g., the maximum torque rating of the motor shaft of the electric motor). For example, in the illustrative embodiment, the torque threshold may be 350 Nm. The torque threshold may be stored in a memory (e.g., the memory 308). In some embodiments, to compensate for noise in the signal from the resolver, multiple torque thresholds may be used, as described in greater detail with reference to FIG. 5. If the control circuitry 304 determines that the internal torque is not greater than the torque threshold ("No" at 408), the process 400 may return back to step 402 and continue to monitor the signal output by the resolver. Otherwise, if the control circuitry 304 determines that the internal torque is greater than the torque threshold ("Yes" at 408), the process 400 may proceed to step 410.

At step 410, the torque security application (e.g., via the control circuitry 304), reduces power to the electric motor (e.g., via the power electronics 312) (e.g., by torque-limiting the electric motor). For example, in some embodiments, the control circuitry 304 performs an emergency stop and reduces the power to the electric motor to zero. In some embodiments, however, it may be advantageous to reduce the power to the electric motor without performing an emergency stop. For example, the control circuitry 304 may reduce the power to the electric motor to a level where the internal torque is less than the torque threshold (e.g., within the rated torque range). In some embodiments, it may be advantageous to provide (e.g., via the user interface 303) a notification to the user that an emergency stop has been performed due to an over-torque torque condition being detected.

Figure 5:
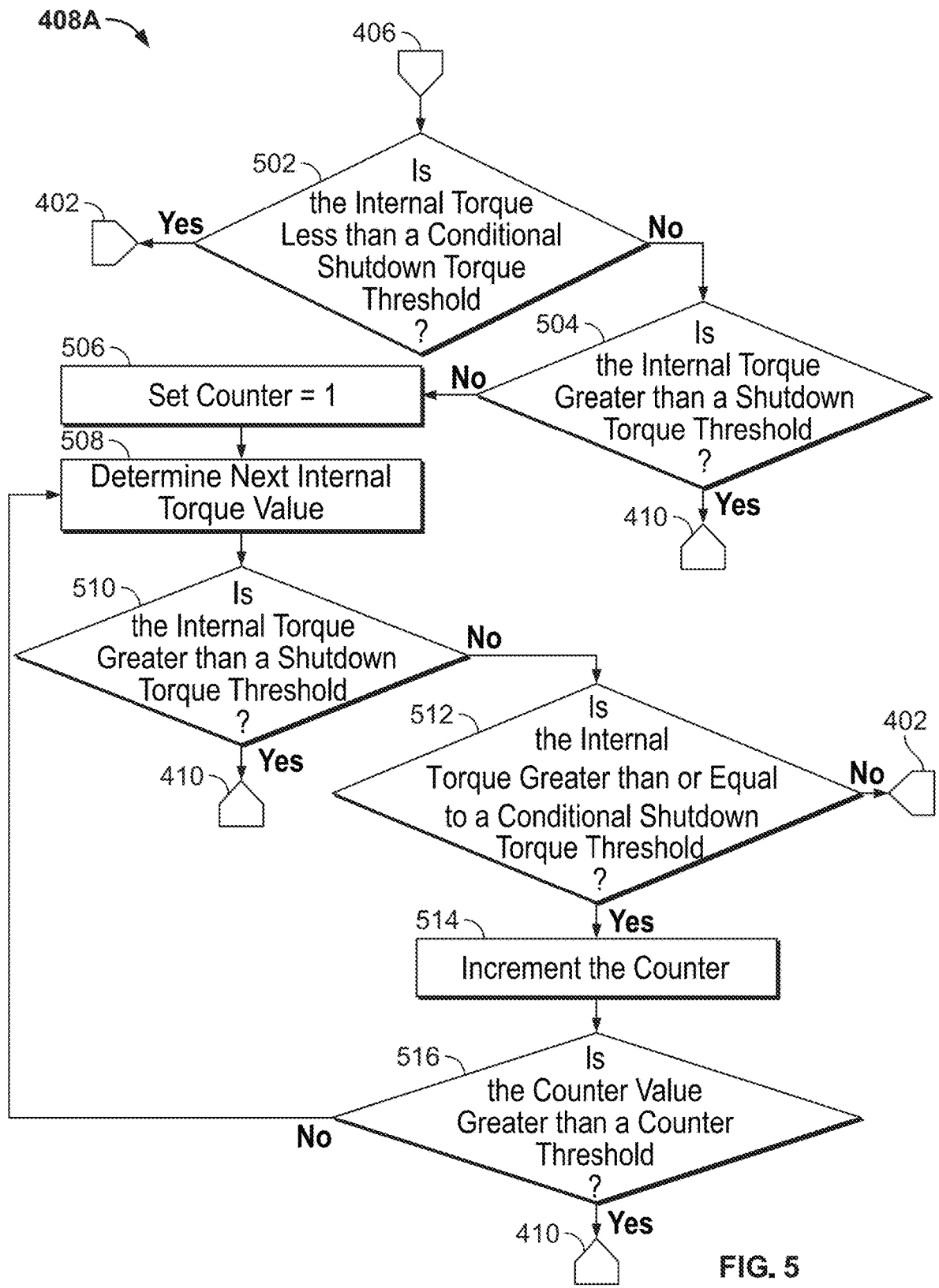
FIG. 5 depicts a flowchart of an illustrative process for determining if a determined input torque exceeds a torque threshold, in accordance with some embodiments of the present disclosure.

FIG. 5 depicts a flowchart of an illustrative process 408A for determining if a determined input torque exceeds a torque threshold, in accordance with some embodiments of the present disclosure. The process 408A is one embodiment of a method for performing step 408 of FIG. 4 and begins after step 406. At step 502, the torque security application (e.g., via the control circuitry 304), determines if the internal torque is less than a conditional shutdown torque threshold. The conditional shutdown torque threshold may be one of a plurality of different torque thresholds. For example, as illustrated in FIG. 5, two different torque thresholds may be used in the process 408A (i.e., the "conditional shutdown torque threshold" and the "shutdown torque threshold"). The different torque thresholds may be determined in advance based on the maximum torque specifications of the powertrain and noise in the signal from the resolver. For example, if the signal from the resolver is distorted by noise, it is possible that the internal torque that is determined (e.g., at step 406 of FIG. 4) may be artificially high for one or more cycles. In this case, if a single torque threshold is used, it is possible that a false over-torque condition may be identified due to noise (e.g., resulting in an unnecessary shutdown). If, however, the threshold torque is set to a higher value to avoid false identifications, real over-torque conditions may not correctly be identified (e.g., false over-torque conditions may be identified). To avoid this problem, while still protecting the powertrain from damage due to an actual over-torque condition, different torque thresholds may be determined. For example, a lower threshold (e.g., the conditional shutdown torque threshold) may be set to be less than the maximum torque specifications of the powertrain. The lower threshold may also be set based on the expected maximum possible distortion level of the signal from the resolver. In some embodiments, for an over-torque condition to be identified, the internal torque must exceed the conditional shutdown torque threshold for a predetermined number of consecutive cycles. An upper threshold (e.g., the shutdown torque threshold) may be set to correspond to the maximum torque specifications of the powertrain. In some embodiments, if the internal torque exceeds the shutdown torque threshold, for example, in one cycle, an over-torque condition may be identified. In some embodiments, it may be advantageous to include a buffer in the thresholds to safeguard against the maximum torque specifications of the powertrain being exceeded. Although two thresholds are discussed, any suitable number of thresholds may be used.

If the control circuitry 304 determines that the internal torque is less than the conditional shutdown torque threshold ("Yes" at 502), the process 408A determines that an over-torque condition does not exist and may return back to step 402 (e.g., of FIG. 4) and continue to monitor the signal output by the resolver. Otherwise, if the control circuitry 304 determines that the internal torque is not less than the conditional shutdown torque threshold ("No" at 502), the process 408A may proceed to step 502.

At step 504, the torque security application (e.g., via the control circuitry 304), determines if the internal torque is greater than the shutdown torque threshold. If the control circuitry 304 determines that the internal torque is greater than the conditional shutdown torque threshold ("Yes" at 504), the process 408A proceeds to step 410, in which the torque security application determines an over-torque condition exists and reduces power to the electric motor. Otherwise, if the control circuitry 304 determines that the internal torque is not greater than the shutdown torque threshold ("No" at 502), the process 408A determines that an over-torque condition may exist (e.g., inconclusive) and the process 408A may proceed to step 506.

At step 506, the torque security application (e.g., via the control circuitry 304), sets a counter equal to 1 (e.g., "counter=1") and the process 408A may proceed to step 508.

At step 508, the torque security application (e.g., via the control circuitry 304), determines the next internal torque value. For example, the process 408A may repeat steps 402, 404, and 406 to determine the next internal torque value (e.g., without resetting the counter value). and the process 408A may proceed to step 510.

At step 510, the torque security application (e.g., via the control circuitry 304), determines if the internal torque is greater than the shutdown torque threshold. If the control circuitry 304 determines that the internal torque is greater than the conditional shutdown torque threshold ("Yes" at 510), the process 408A proceeds to step 410, in which the torque security application determines an over-torque condition exists and reduces power to the electric motor. Otherwise, if the control circuitry 304 determines that the internal torque is not greater than the shutdown torque threshold ("No" at 510), the process 408A may proceed to step 512.

At step 512, the torque security application (e.g., via the control circuitry 304), determines if the internal torque is greater than or equal to the conditional shutdown torque threshold. If the control circuitry 304 determines that the internal torque is not greater than or equal to the conditional shutdown torque threshold and less than or equal to the shutdown torque threshold ("No" at 512), the control circuitry 304 determines that an over-torque condition does not exist and the process 408A may return back to step 402 (e.g., of FIG. 4) and continue to monitor the signal output by the sensor 316. Otherwise, if the control circuitry 304 determines that the internal torque is greater than or equal to the conditional shutdown torque threshold and less than or equal to the shutdown torque threshold ("Yes" at 512), the control circuitry 304 determines that an over-torque condition may exist (e.g., inconclusive) and the process 408A may proceed to step 514.

At step 514, the torque security application (e.g., via the control circuitry 304), increments the counter by one and the process 408A may proceed to step 516.

At step 516, the torque security application (e.g., via the control circuitry 304), determines if the counter value is greater than a counter threshold. The counter threshold value determines the number of consecutive internal torque values that must satisfy the relationship in step 512 before the control circuitry 404 recognizes an over-torque condition. In some embodiments, the counter threshold value is determined in advance based on the expected noise in the signal from the resolver and how quickly the signal settles (e.g., in response to a large acceleration). For example, in an illustrative embodiment, the counter threshold is set to ten. However, this is only an example, and the counter threshold may be set to any suitable value. In some embodiments, the counter threshold value is periodically updated based on noise that is detected in the signal from the resolver (e.g., during steady-state operation or during calibration). If the control circuitry 304 determines that the counter value is greater than the counter threshold ("Yes" at 516), the control circuitry 304 determines that an over-torque condition exists, and the process 408A may proceed to step 410. Otherwise, if the control circuitry 304 determines that the counter value is greater than the counter threshold ("No" at 516), the process 408A determines that an over-torque condition may exist (e.g., inconclusive) and the process 408A may proceed back to step 508.

In the torque security application described above with reference to FIGS. 4 and 5, the determined internal torque (e.g., step 406) is compared with torque threshold values (e.g., steps 408, 502, 504, 510, and 512) to determine if an over-torque condition exists. However, in some embodiments, it may be advantageous to determine if an over-torque condition exists based on the determined acceleration alone (e.g., step 404), without determining the internal torque, as described below with reference to FIG. 6.

Figure 6:
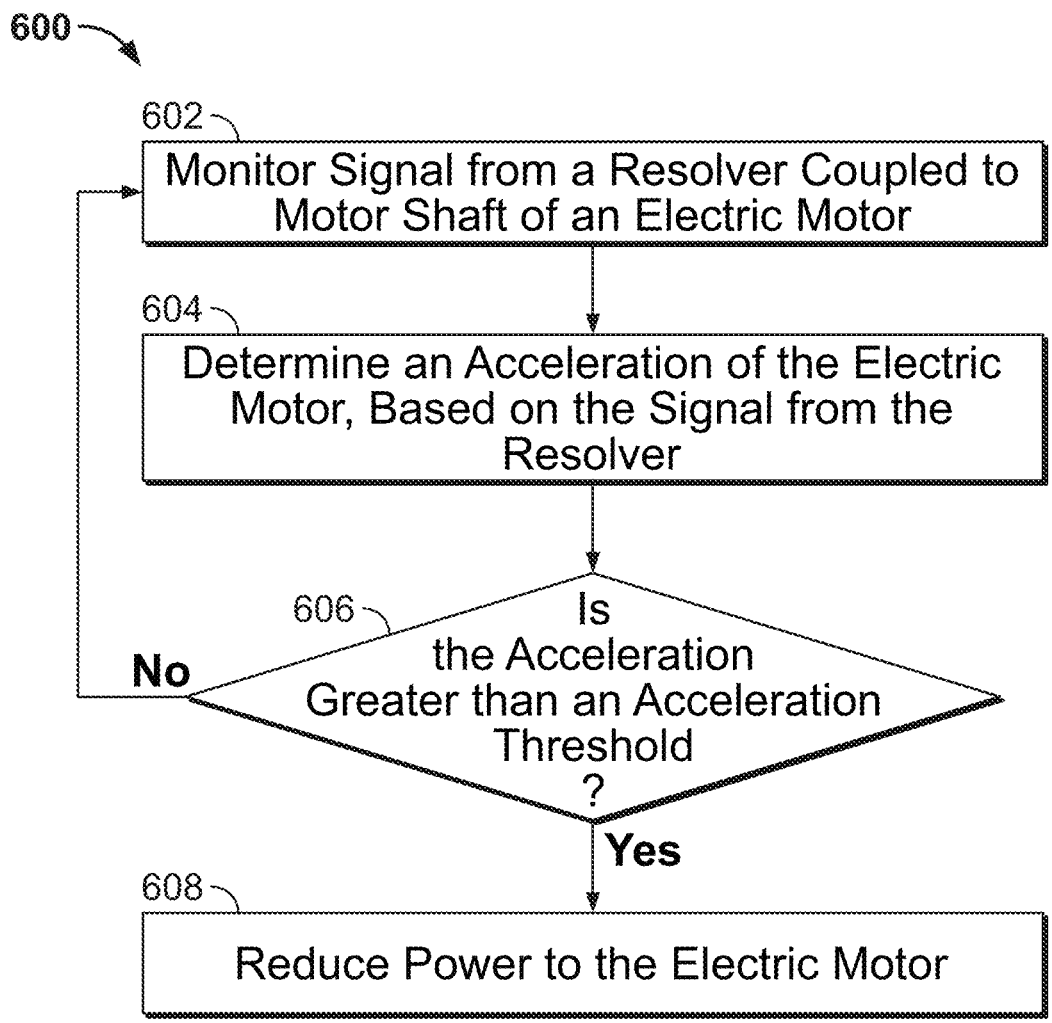
FIG. 6 depicts a flowchart of an illustrative process implementing a torque security application, in accordance with some embodiments of the present disclosure.

FIG. 6 depicts a flowchart of an illustrative process 600 implementing a torque security application, in accordance with some embodiments of the present disclosure. The process 600 begins at step 602. Steps 602 and 604 correspond to steps 402 and 404 of FIG. 4 and are not described again here in detail.

At step 606, the torque security application (e.g., via the control circuitry 304), determines if the acceleration is greater than an acceleration threshold. The acceleration threshold may be determined in advance based on the torque threshold discussed above in step 408 and the relationship set forth above in Equation [2]. For example, by setting the internal torque in Equation [3] equal to the torque threshold (e.g., determined in advance based on the maximum torque specifications of the powertrain), Equation [2] may be rearranged to solve for the maximum allowable acceleration of the electric motor before an over-torque condition exists, as shown below in Equation [3].

$$\text{acceleration\_threshold} = \frac{\text{torque\_threshold}}{\text{inerta}_{(motor\ and\ gearbox)}} \qquad \text{Equation [3]}$$

For example, in the illustrative embodiment, if the torque threshold is 350 Nm and the inertia of the electric motor and gearbox is 0.02 kg*m², the acceleration threshold may be set to 17,500 radian/s.

If the control circuitry 304 determines that the acceleration is not greater than the acceleration threshold ("No" at 606), the process 600 may return back to step 602 and continue to monitor the signal output by the resolver. Otherwise, if the control circuitry 304 determines the acceleration is greater than the acceleration threshold ("Yes" at 606), the control circuitry 304 determines that an over-torque condition may exist and the process 600 may proceed to step 608. Step 608 corresponds to step 410 of FIG. 4 and is not described again here in detail.

In some cases, a tooth of the input gear coupled to the motor shaft of the electric motor may be damaged (e.g., from wear in repeated high-torque situations). Accordingly, in some embodiments, it may be advantageous to determine the health of the gearbox. In an illustrative example, the control system 302 (e.g., or the control circuitry 304) may be configured to execute a torque security application to diagnose damage to the gearbox and provide notifications (e.g., via the user interface 303) to a user (e.g., the driver of the vehicle) about the health of the gearbox.

Figure 7:
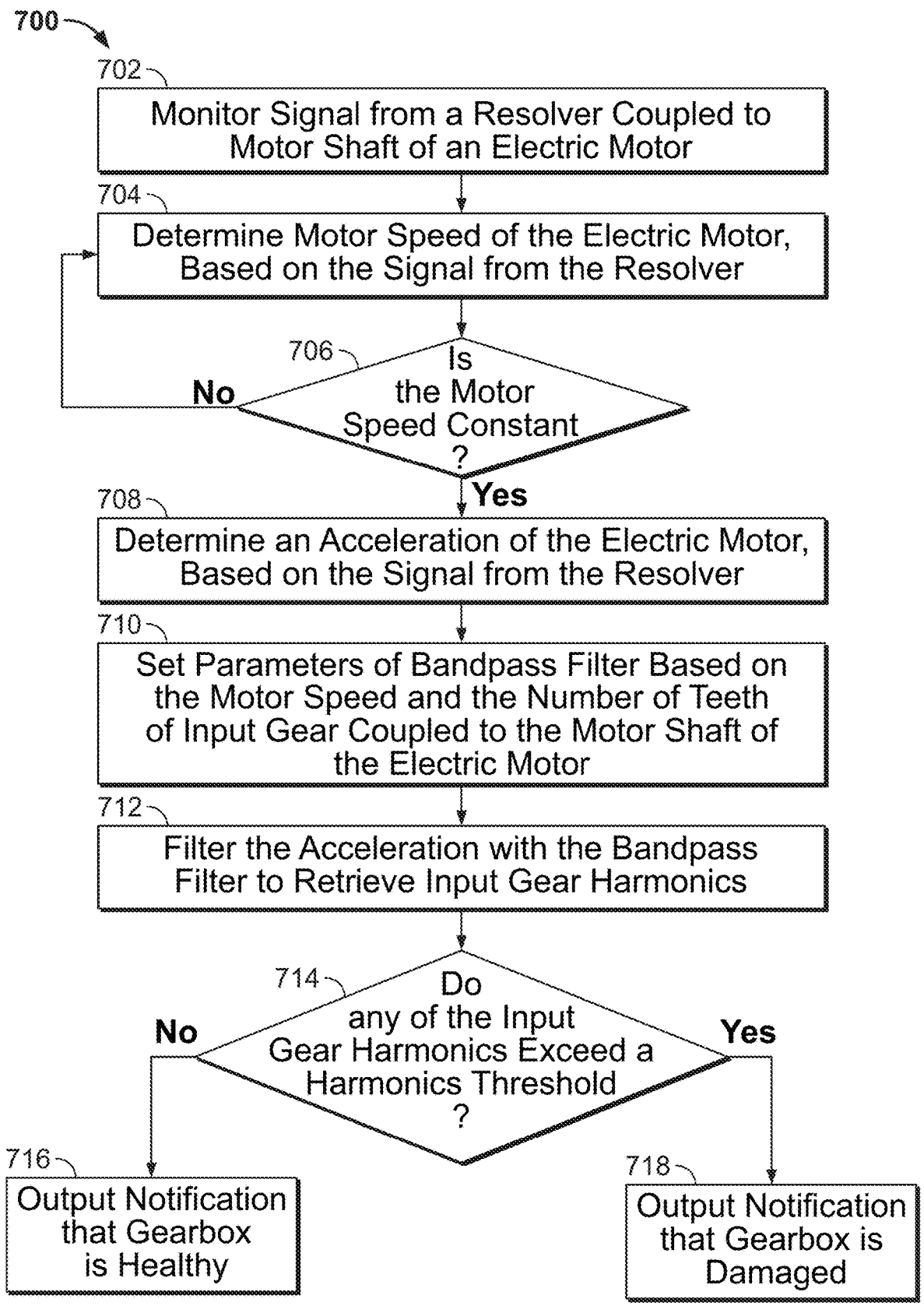
FIG. 7 depicts a flowchart of an illustrative process implementing a torque security application, in accordance with some embodiments of the present disclosure.

FIG. 7 depicts a flowchart of an illustrative process 700 implementing a torque security application, in accordance with some embodiments of the present disclosure. The process 700 may be implemented by, for example, the control system 302 of FIG. 3 (e.g., or any aspects thereof), any other suitable system for executing computer instructions and generating a notification, or any combination thereof.

The process 700 begins at step 702, when the torque security application (e.g., via the control circuitry 304) monitors (e.g., via the communications interface 310) a signal output by a resolver (e.g., the resolver 305) that measures the degrees of rotation of a motor shaft (e.g., the motor shaft 307) of an electric motor (e.g., the electric motor 301). Step 702 corresponds to, for example, step 402 of FIG. 4 and is not described again here in detail.

At step 704, the torque security application (e.g., via the control circuitry 304), determines the motor speed of the electric motor, based on the signal from the resolver. For example, the control circuitry 304 calculates the angular velocity of the motor shaft. In some embodiments, it may be advantageous to determine the motor speed based on the determined acceleration (e.g., determined in step 404 of FIG. 4). However, any suitable method may be used.

At step 706, the torque security application (e.g., via the control circuitry 304), determines if the motor speed is constant. For example, the control circuitry 304 may implement the process 700 periodically (e.g., when cruise control is set and the speed of the vehicle is constant). If the control circuitry 304 determines that the motor speed is not constant ("No" at 706), the process 700 may return back to step 704. Otherwise, if the control circuitry 304 determines that the motor speed is constant ("Yes" at 706), the process 700 may proceed to step 708. In some embodiments, the control circuitry 304 may determine that the motor speed is constant if the motor speed is within a predetermined range.

At step 708, the torque security application (e.g., via the control circuitry 304), determines an acceleration of the electric motor, based on the signal received from the resolver.

Step 708 corresponds to, for example, step 406 of FIG. 4 and is not described again here in detail.

At step 710, the torque security application (e.g., via the control circuitry 304), sets parameters of a bandpass filter based on the motor speed (e.g., from step 704) and the number of teeth on the input gear (e.g., the input gear 309) coupled to the motor shaft of the electric motor.

For example, if the input gear has forty teeth, the control circuitry 304 sets the parameters of the bandpass filter to capture the fortieth harmonic.

Figure 8:
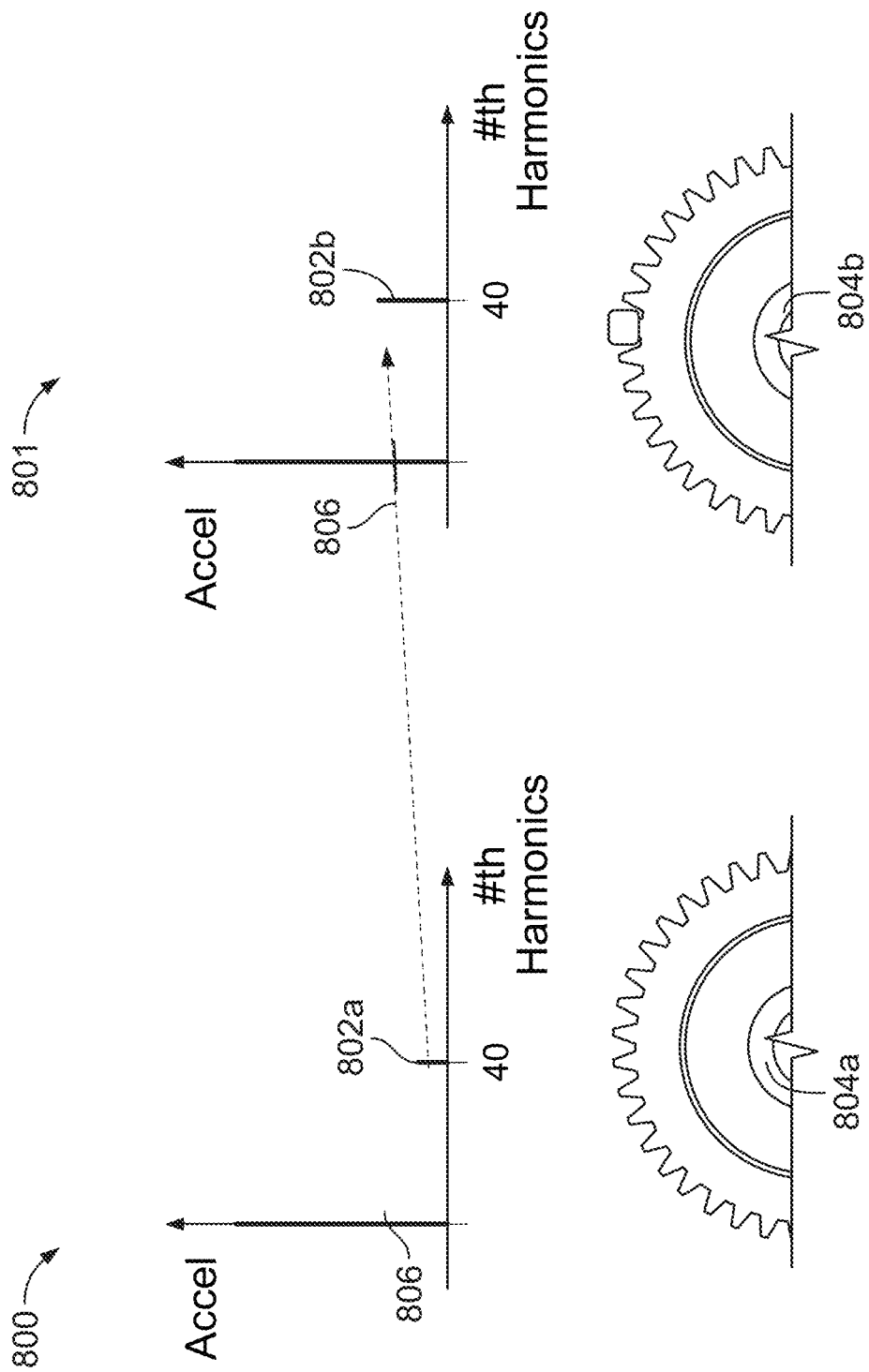
FIG. 8 depicts graphs of input gear harmonics in the frequency domain, in accordance with some embodiments of the present disclosure.

At step 712, the torque security application (e.g., via the control circuitry 304), filters the acceleration of the electric motor with the bandpass filter to retrieve input gear harmonics. In some embodiments, instead of using the bandpass filter in steps 710 and 712, it may be advantageous to convert the portion of the signal corresponding to the desired harmonic into the frequency domain (e.g., using a Fourier transform) and identify the input gear harmonics in the frequency domain, as illustrated in FIG. 8.

At step 714, the torque security application (e.g., via the control circuitry 304), determines if any of the input gear harmonics exceed a threshold. For example, if a tooth on the input gear is damaged or missing, an input gear harmonic (e.g., corresponding to the number of teeth of the input gear) will exceed a predetermined threshold. The threshold may be predetermined (e.g., to filter out any noise) and stored in a memory (e.g., the memory 308). If the control circuitry 304 determines that an input gear harmonic does not exceed the threshold ("No" at 714), the control circuitry 304 determines that the gearbox is healthy and the process 700 may proceed to step 716. Otherwise, if the control circuitry 304 determines that an input gear harmonic does exceed the threshold ("Yes" at 714), the control circuitry 304 determines that the gearbox is damaged (e.g., the input gear is damaged) and may proceed to step 718.

At step 716, the torque security application (e.g., via the control circuitry 304), outputs a notification that the gearbox is healthy. For example, the control circuitry 304 may output the notification (e.g., via the user interface 303) to a user. For example, the user interface 303 may display the message informing the user that the gearbox is healthy.

At step 718, the torque security application (e.g., via the control circuitry 304), outputs a notification that the gearbox is damaged. For example, the control circuitry 304 may output the notification (e.g., via the user interface 303) to a user. For example, the user interface 303 may display the message informing the user that the gearbox is damaged and recommend that the user immediately stop driving and service the vehicle. In some embodiments, it may be advantageous to perform an emergency stop (e.g., step 410 of FIG. 4) when the gearbox is damaged. In some embodiments, it may also be advantageous to send a copy of the notification to, e.g., the manufacturer of the vehicle, a maintenance shop associated with the vehicle, a vehicle dealership, etc. In some embodiments, it may also be advantageous to store a copy of the notification, along with any technical data, in a vehicle log (e.g., in the memory 308).

FIG. 8 depicts graphs 800, 801 of input gear harmonics in the frequency domain, in accordance with some embodiments of the present disclosure. As set for above, analysis of the converted acceleration signal in the frequency domain may be used instead of the analysis in steps 710 and 712 of FIG. 7. Graph 800 shows a retrieved input gear harmonic 802a (e.g., the fortieth harmonic) for an input gear 804a that is not damaged (e.g., with all forty teeth). As shown, the input gear harmonic 802a does not exceed a threshold 806 (e.g., "No" at step 714). Graph 801 shows a retrieved input gear harmonic 802b (e.g., the fortieth harmonic) for an input gear 804b that is damaged (e.g., with a missing tooth). As shown, the input gear harmonic 802b exceeds a threshold 806 (e.g., "Yes" at step 714), indicating that the input gear is damaged. In some embodiments, although an input gear with forty teeth is described, the process 700 may be used to diagnose the health of other gears in the gearbox having any number of teeth.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:

1. A method of protecting a powertrain of a vehicle performed by a control system, the method comprising:
   monitoring a signal from a sensor coupled to a motor shaft of an electric motor, wherein the sensor indicates an amount of rotation of the motor shaft;
   determining an acceleration of the electric motor, based on the signal from the sensor;
   determining an internal torque between the motor shaft and an input gear coupled to the motor shaft, based on the acceleration of the electric motor and an inertia of the electric motor and a gearbox, wherein the powertrain of the vehicle comprises the gearbox and the electric motor, and the input gear couples the electric motor to the gearbox;
   determining whether the internal torque exceeds a conditional shutdown threshold torque;
   in response to determining that the internal torque exceeds the conditional shutdown threshold torque, incrementing a counter; and
   in response to determining that the counter exceeds a counter threshold, reducing power output to the electric motor.

2. The method of claim 1, wherein the reducing the power output to the electric motor comprises performing an emergency shutoff by reducing the power output to zero.

3. The method of claim 1, wherein the reducing the power output to the electric motor comprises reducing an output of an inverter driving the electric motor.

4. The method of claim 1, wherein the determining the internal torque comprises determining a product of the acceleration of the electric motor and the inertia of the electric motor and the gearbox.

5. The method of claim 1, wherein:
   the determining whether the internal torque exceeds the conditional shutdown threshold torque comprises:
      determining whether the internal torque exceeds a shutdown threshold torque; and
      in response to determining that the internal torque does not exceed the shutdown first threshold torque, determining whether the internal torque exceeds the conditional shutdown threshold torque;
   the method further comprising:
      in response to determining that the internal torque does not exceed the conditional shutdown threshold torque, resetting the counter.

6. The method of claim 5, wherein the shutdown threshold torque is greater than the conditional shutdown threshold torque.

7. The method of claim 5, wherein the shutdown threshold torque corresponds to a torque limit of the motor shaft.

8. The method of claim 1, further comprising:
   determining a speed of the electric motor, based on the signal from the sensor;
   determining whether the speed of the electric motor is constant; and
   in response to determining that the speed of the electric motor is constant:
      filtering the acceleration of the electric motor with a bandpass filter; and
      determining whether the input gear is damaged, based on an output of the bandpass filter.

9. The method of claim 8, further comprising setting parameters of the bandpass filter based on the speed of the electric motor and a number of teeth on the input gear.

10. The method of claim 9, wherein the determining whether the input gear is damaged comprises determining whether a harmonic of the output of the bandpass filter, corresponding to the number of teeth on the input gear, exceeds a threshold;
    in response to determining that the harmonic of the output of the bandpass filter exceeds the threshold, determining that the input gear is damaged; and
    in response to determining that the input gear is damaged, generating for output a notification that the input gear is damaged.

11. A system for protecting a powertrain of a vehicle, the system comprising:
    input circuitry configured to:
       receive a signal from a sensor coupled to a motor shaft of an electric motor, wherein the sensor indicates an amount of rotation of the motor shaft;
    control circuitry configured to:
       determine an acceleration of the electric motor, based on the signal from the sensor;
       determine an internal torque between the motor shaft and an input gear coupled to the motor shaft, based on the acceleration of the electric motor and an inertia of the electric motor and a gearbox, wherein the powertrain of the vehicle comprises the gearbox and the electric motor, and the input gear couples the electric motor to the gearbox;
       determine whether the internal torque exceeds a conditional shutdown threshold torque;
       in response to determining that the internal torque exceeds the conditional shutdown threshold torque, increment a counter; and in response to determining that the counter exceeds a counter threshold, reduce power output to the electric motor.

12. The system of claim 11, wherein the control circuitry is further configured, when reducing the power output to the electric motor, to perform an emergency shutoff by reducing the power output to zero.

13. The system of claim 11, wherein the control circuitry is further configured, when reducing the power output to the electric motor, to reduce an output of an inverter driving the electric motor.

14. The system of claim 11, wherein the control circuitry is further configured, when determining the internal torque, to determine a product of the acceleration of the electric motor and the inertia of the electric motor and the gearbox.

15. The system of claim 11, wherein:
the control circuitry is further configured, when determining whether the internal torque exceeds the conditional shutdown threshold torque, to:
  determine whether the internal torque exceeds a shutdown threshold torque;
  in response to determining that the internal torque does not exceed the shutdown first threshold torque, determine whether the internal torque exceeds the conditional shutdown threshold torque; and
  in response to determining that the internal torque does not exceed the conditional shutdown threshold torque, reset the counter.

16. The system of claim 15, wherein the shutdown threshold torque is greater than the conditional shutdown threshold torque.

17. The system of claim 11, wherein the control circuitry is further configured to:
determine a speed of the electric motor, based on the signal from the sensor;
determine whether the speed of the electric motor is constant; and
in response to determining that the speed of the electric motor is constant:
  filter the acceleration of the electric motor with a bandpass filter; and
  determine whether the input gear is damaged, based on an output of the bandpass filter.

18. The system of claim 17, wherein the control circuitry is further configured to set parameters of the bandpass filter based on the speed of the electric motor and a number of teeth on the input gear.

19. The system of claim 18, wherein:
the control circuitry is further configured, when determining whether the input gear is damaged, to determine whether a harmonic of the output of the bandpass filter, corresponding to the number of teeth on the input gear, exceeds a threshold; and
the control circuitry is further configured to:
in response to determining that the harmonic of the output of the bandpass filter exceeds the threshold, determine that the input gear is damaged; and
in response to determining that the input gear is damaged, generate for output a notification that the input gear is damaged.

20. A vehicle comprising:
an electric motor comprising a motor shaft and an input gear coupled to the motor shaft;
power electronics configured to output power to the electric motor;
a gearbox, wherein the input gear couples the electric motor to the gearbox;
a sensor coupled to the motor shaft and configured to output a signal indicating an amount of rotation of the motor shaft;
input circuitry configured to receive the signal from the sensor; and
control circuitry configured to:
  determine an acceleration of the electric motor, based on the signal from the sensor;
  determine an internal torque between the motor shaft and the input gear, based on the acceleration of the electric motor and an inertia of the electric motor and the gearbox;
  determine whether the internal torque exceeds a conditional shutdown threshold torque;
  in response to determining that the internal torque exceeds the conditional shutdown threshold torque, incrementing a counter; and
  in response to determining that the counter exceeds a counter threshold, control the power electronics to reduce the power output to the electric motor.

* * * * *